UNITED STATES PATENT OFFICE.

REES B. SMITH, OF MOUNT PLEASANT, OHIO.

IMPROVED PAINT.

Specification forming part of Letters Patent No. 56,814, dated July 31, 1866.

*To all whom it may concern:*

Be it known that I, REES B. SMITH, of Mount Pleasant, in the county of Jefferson and State of Ohio, have made a new and useful Improvement in Composition for Paint; and I do hereby declare the following to be a full, clear, and exact description of the nature and composition of the same, sufficient to enable one skilled in the art to which it is allied to compound and use the same.

The body of the paint consists of a certain earthy substance of a red clayey appearance which is found in abundance in Jefferson county, Ohio, and adjoining counties, and whose composition is about as follows:

| | Per cent. |
|---|---|
| Silica | 37.35 |
| Peroxide of iron | 7.50 |
| Alumina | 12.70 |
| Lime | 4.98 |
| Magnesia | 10.31 |
| Carbonic acid | 15.25 |
| Water | 12.00 |
| | 100.09 |

From which analysis it may be safely assumed that the substance consists of—

| | Per cent. |
|---|---|
| Hydrous silicate of iron and alumina | 69.55 |
| Carbonate of lime | 8.98 |
| Carbonate of magnesia | 21.65 |
| | 100.18 |

Which shows a somewhat unusual predominance of magnesia over lime.

The substance, which is locally known as "Smith's Mineral," is of a bluish-brown color when exposed to the atmosphere, of nearly the specific gravity of ordinary iron ore, and is insoluble in water.

The substance, in preparing for use, is finely powdered by grinding, and is mixed with oil to the proper consistence for paint.

The usual drier may be added at discretion, and modification of the color may be attained by roasting the mineral, or by the addition of pigments of the requisite color, chrome green or yellow, white lead, &c.

The paint thus obtained is permanent and cheap, is not apt to crack, scale, or blister, has an agreeable natural color, and is an economical and valuable addition to the uses of the trade.

What I claim herein as new, and desire to secure by Letters Patent, is—

The compound described, as a new and useful composition for paint.

The above specification of my improved composition for paint signed this 14th day of May, 1866.

REES B. SMITH.

Witnesses:
ALEX. A. C. KLAUCKE,
EDWARD H. KNIGHT.